United States Patent
Bai et al.

(10) Patent No.: US 12,342,425 B2
(45) Date of Patent: Jun. 24, 2025

(54) METHODS AND APPARATUS FOR UE REPORTING OF TIME VARYING ML CAPABILITY

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Franklin Park, NJ (US); Danlu Zhang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/228,609

(22) Filed: Apr. 12, 2021

(65) Prior Publication Data
US 2022/0330012 A1  Oct. 13, 2022

(51) Int. Cl.
*H04W 8/24* (2009.01)
*G06N 20/00* (2019.01)

(52) U.S. Cl.
CPC .............. *H04W 8/24* (2013.01); *G06N 20/00* (2019.01)

(58) Field of Classification Search
CPC ................................ H04W 8/24; G06N 20/00
USPC ...................................................... 370/254
See application file for complete search history.

(56) References Cited

U.S. PATENT DOCUMENTS

| | | | |
|---|---|---|---|
| 2018/0084539 A1 | 3/2018 | Kubota et al. | |
| 2019/0149425 A1* | 5/2019 | Larish | G06N 3/045 |
| | | | 706/16 |
| 2020/0065708 A1* | 2/2020 | Beaudoin | G06N 3/082 |
| 2021/0064996 A1* | 3/2021 | Wang | H04W 24/08 |
| 2021/0243752 A1* | 8/2021 | Bao | H04B 7/088 |
| 2022/0335337 A1* | 10/2022 | Kovács | H04W 4/50 |

FOREIGN PATENT DOCUMENTS

| | | |
|---|---|---|
| WO | 2020080989 A1 | 4/2020 |
| WO | 2020171803 A1 | 8/2020 |
| WO | 2021063500 A1 | 4/2021 |

OTHER PUBLICATIONS

International Search Report and Written Opinion—PCT/US2022/020211—ISA/EPO—Jun. 22, 2022.

* cited by examiner

*Primary Examiner* — Christopher M Crutchfield
*Assistant Examiner* — Jean F Voltaire
(74) *Attorney, Agent, or Firm* — Procopio, Cory, Hargreaves & Savitch

(57) ABSTRACT

The present disclosure relates to methods and devices for wireless communication of an apparatus, e.g., a UE and/or a base station. The apparatus may perform a ML procedure based on at least one initial ML capability of the UE. The apparatus may also determine at least one updated ML capability for the ML procedure corresponding to an update to the at least one initial ML capability. Further, the apparatus may transmit, to a base station, an indication of the at least one updated ML capability for the ML procedure. The apparatus may also perform the ML procedure based on the at least one updated ML capability or based on the at least one initial ML capability.

30 Claims, 10 Drawing Sheets

METHODS AND APPARATUS FOR UE REPORTING OF TIME VARYING ML CAPABILITY

BACKGROUND

Technical Field

The present disclosure relates generally to communication systems, and more particularly, to reporting of machine learning (ML) capability in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a query for at least one initial machine learning (ML) capability; and transmit, to the base station based on the query, an indication of the at least one initial ML capability. The apparatus may also perform a ML procedure based on at least one initial ML capability of the UE. The apparatus may also determine at least one updated ML capability for the ML procedure corresponding to an update to the at least one initial ML capability. Additionally, the apparatus may transmit, to the base station, a scheduling request for the indication; and receive, from the base station based on the scheduling request, an uplink (UL) grant to schedule an UL transmission for the indication, where the indication is transmitted based on the UL grant. The apparatus may also transmit, to a base station, an indication of the at least one updated ML capability for the ML procedure. The apparatus may also receive, from the base station, an acceptance or a rejection based on the indication of the at least one updated ML capability. Further, the apparatus may receive, from the base station, an indication of an updated configuration for the ML procedure based on the indication of the at least one updated ML capability. The apparatus may also perform the ML procedure based on the at least one updated ML capability or based on the at least one initial ML capability.

In another aspect of the disclosure, a method, a computer-readable medium, and an apparatus are provided. The apparatus may be a base station. The apparatus may transmit, to a UE, a query for at least one initial ML capability; and receive, from the UE based on the query, an indication of the at least one initial ML capability. The apparatus may also initiate a machine learning (ML) procedure based on at least one initial ML capability of a UE. The apparatus may also receive, from the UE, a scheduling request for an indication; and transmit, to the UE based on the scheduling request, an uplink (UL) grant to schedule an UL transmission for the indication, where the indication is based on the UL grant. Also, the apparatus may receive, from the UE, an indication of at least one updated ML capability for the ML procedure. The apparatus may also transmit, to the UE, an acceptance or a rejection based on the indication of the at least one updated ML capability. The apparatus may also transmit, to the UE, an indication of an updated configuration for the ML procedure based on the indication of the at least one updated ML capability. Moreover, the apparatus may maintain the ML procedure based on the at least one updated ML capability or based on the at least one initial ML capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
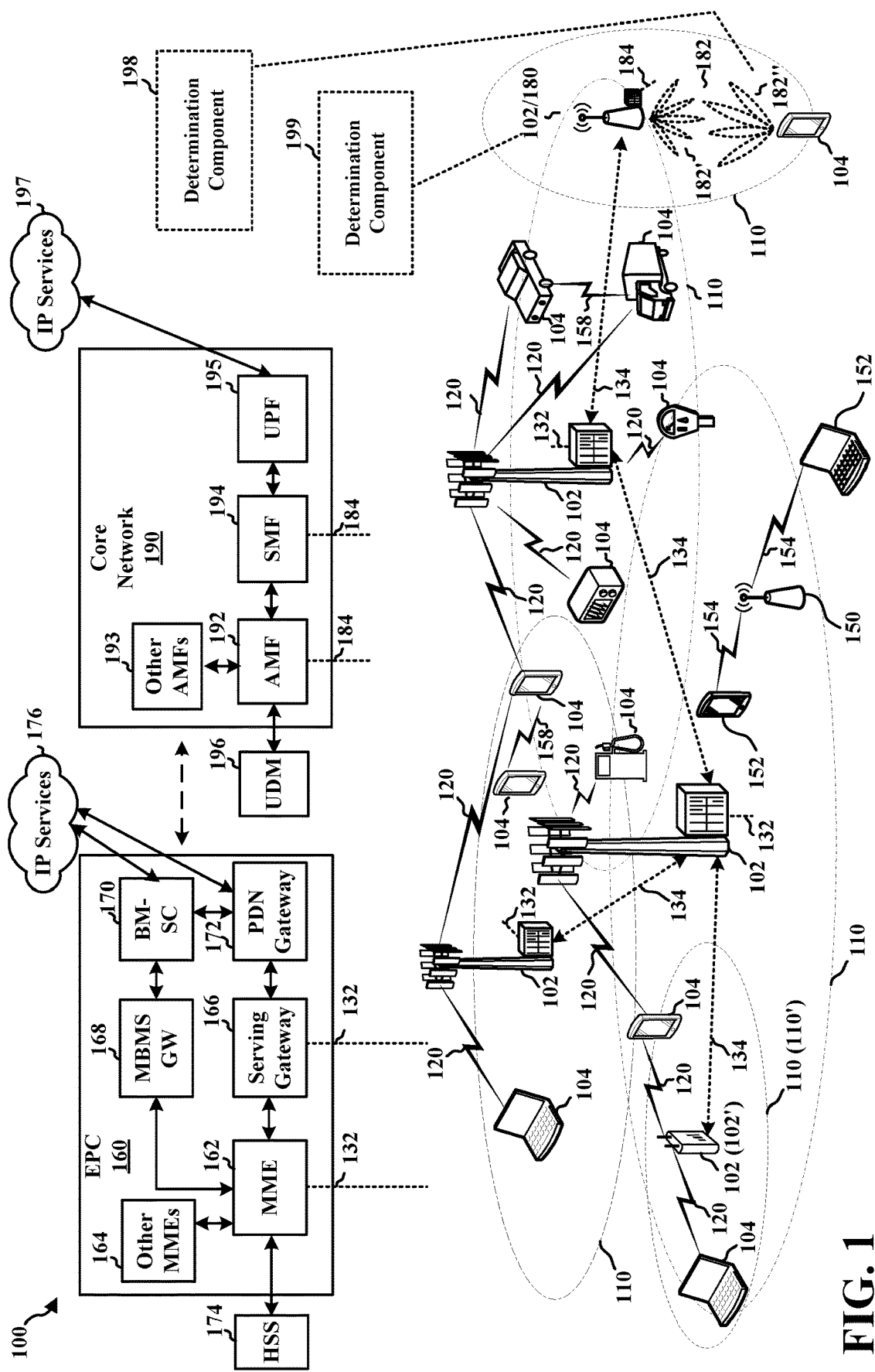
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to receive, from a base station, a query for at least one initial machine learning (ML) capability; and transmit, to the base station based on the query, an indication of the at least one initial ML capability. Determination component 198 may also be configured to perform a ML procedure based on at least one initial ML capability of the UE. Determination component 198 may also be configured to determine at least one updated ML capability for the ML procedure corresponding to an update to the at least one initial ML capability. Determination component 198 may also be configured to transmit, to the base station, a scheduling request for the indication; and receive, from the base station based on the scheduling request, an uplink (UL) grant to schedule an UL transmission for the indication, where the indication is transmitted based on the UL grant. Determination component 198 may also be configured to transmit, to a base station, an indication of the at least one updated ML capability for the ML procedure. Determination component 198 may also be configured to receive, from the base station, an acceptance or a rejection based on the indication of the at least one updated ML capability. Determination component 198 may also be configured to receive, from the base station, an indication of an updated configuration for the ML procedure based on the indication of the at least one updated ML capability. Determination component 198 may also be configured to perform the ML procedure based on the at least one updated ML capability or based on the at least one initial ML capability.

Referring again to FIG. 1, in certain aspects, the base station 180 may include a determination component 199 configured to transmit, to a UE, a query for at least one initial ML capability; and receive, from the UE based on the query, an indication of the at least one initial ML capability. Determination component 199 may also be configured to initiate a machine learning (ML) procedure based on at least one initial ML capability of a UE. Determination component 199 may also be configured to receive, from the UE, a scheduling request for an indication; and transmit, to the UE based on the scheduling request, an uplink (UL) grant to schedule an UL transmission for the indication, where the indication is based on the UL grant. Determination component 199 may also be configured to receive, from the UE, an indication of at least one updated ML capability for the ML procedure. Determination component 199 may also be configured to transmit, to the UE, an acceptance or a rejection based on the indication of the at least one updated ML capability. Determination component 199 may also be configured to transmit, to the UE, an indication of an updated configuration for the ML procedure based on the indication of the at least one updated ML capability. Determination component 199 may also be configured to maintain the ML procedure based on the at least one updated ML capability or based on the at least one initial ML capability.

Although the following description may be focused on 5G NR, the concepts described herein may be applicable to other similar areas, such as LTE, LTE-A, CDMA, GSM, and other wireless technologies.

Figure 2:
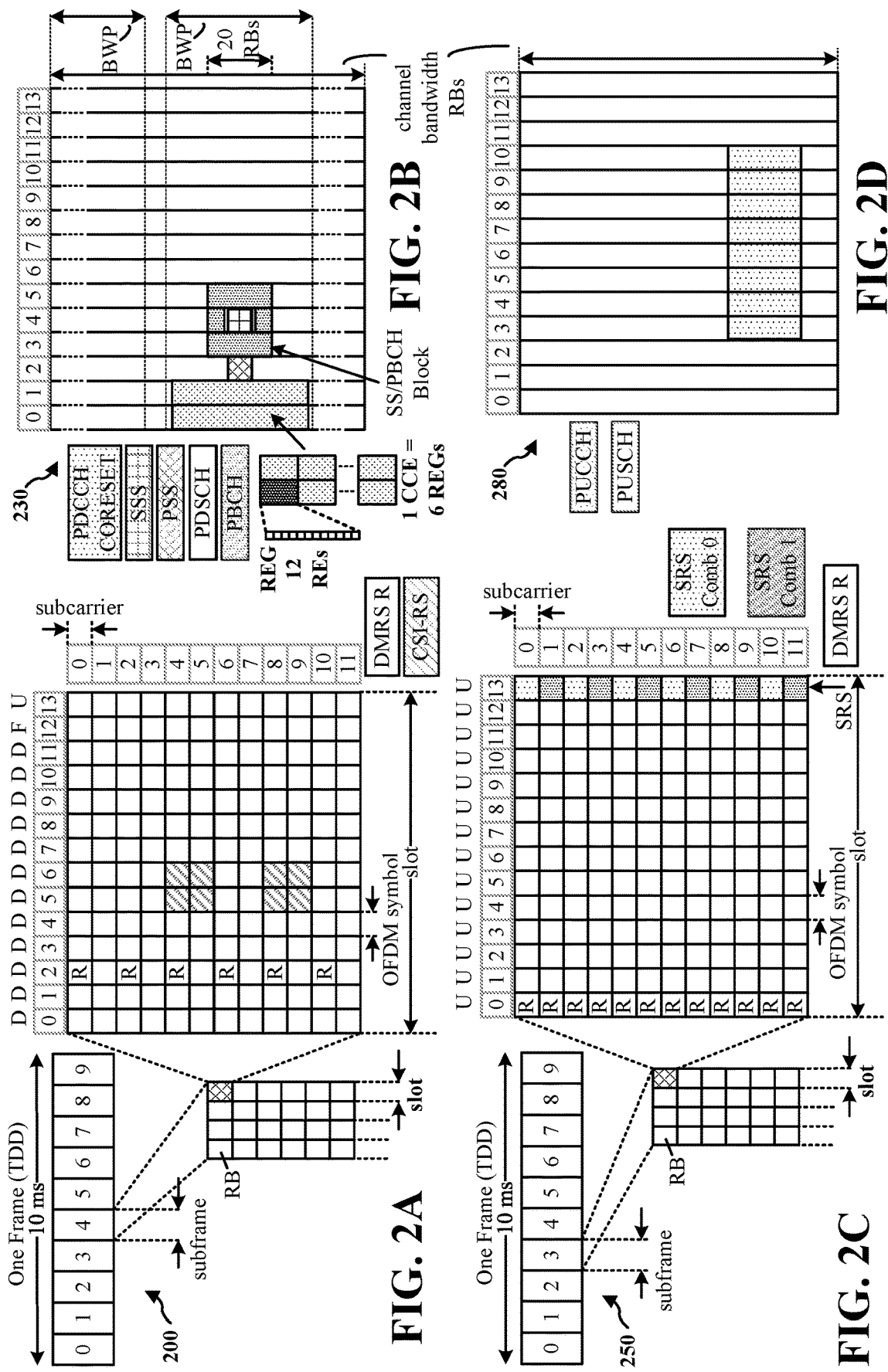
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
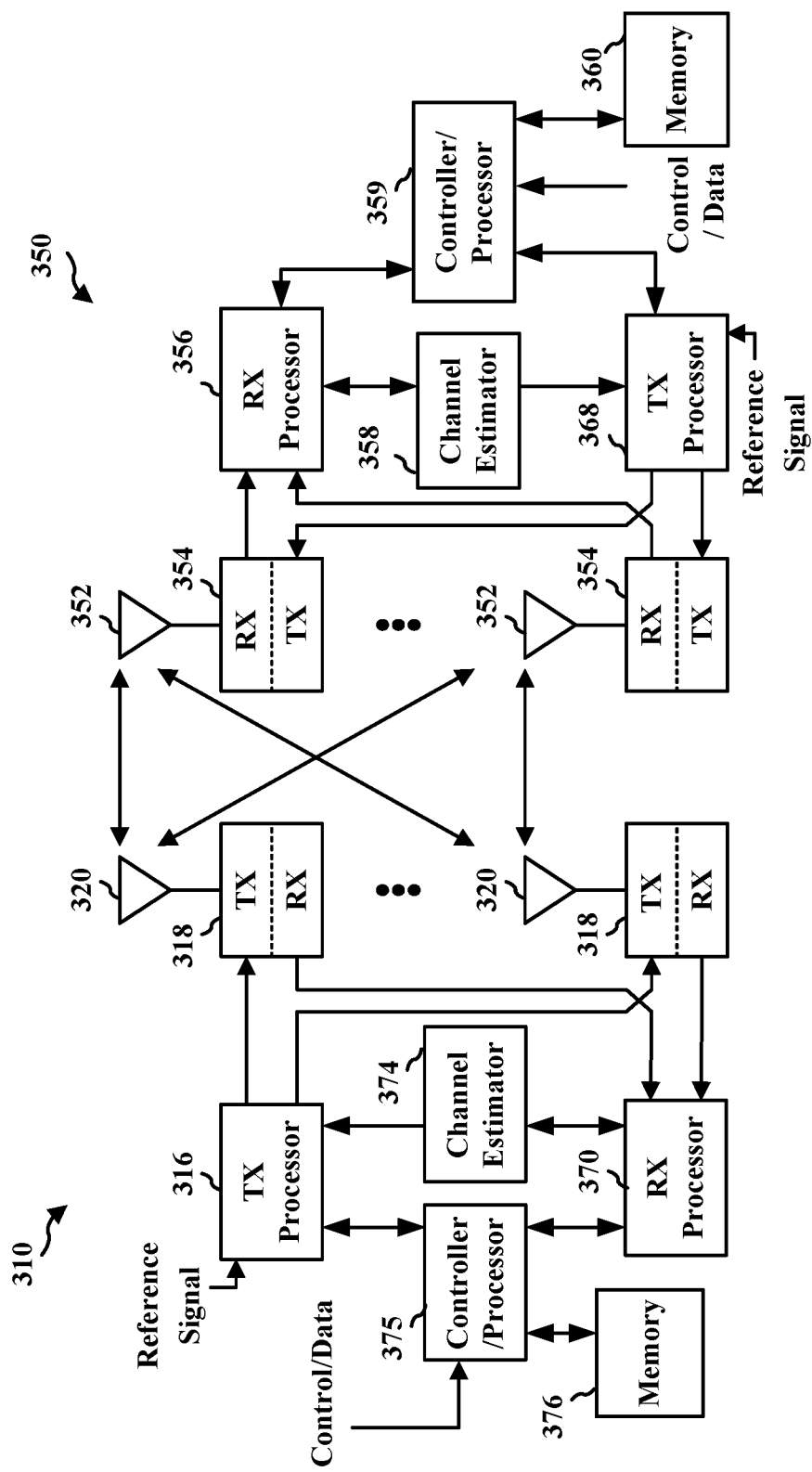
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications utilize machine learning (ML) or artificial intelligence (AI) with different types of communications. For instance, aspects of wireless communications may consider the association or interplay of ML/AI and wireless communications. ML is a branch of AI that may allow systems to learn and adapt from data. Although the term ML is used, it should be understood that ML encompasses AI as well. ML procedures may utilize computer algorithms to improve certain operations, e.g., wireless communication, through experience and/or data. For example, ML procedures may utilize data analysis in order to automate the process of analytical model building. ML may also identify patterns and make decisions to help reduce the amount of human intervention. Further, ML algorithms may build models based on sampled data, which may be referred to as training data. ML procedures may include ML training, or vice versa. Also, ML procedures may be referred to as ML training, or vice versa. Additionally, different types of ML procedures and/or ML algorithms may utilize a large amount of data exchanged between different nodes, e.g., a UE or a base station/network. In some instances, a dedicated interface or dedicated signaling may need to be defined in order to facilitate a data exchange related to ML procedures. In these instances, ML data may be a number of different types of information, such as training data, parameters for ML modules, gradient updates of ML modules, etc. For example, ML data may utilize different types of ML, e.g., federated learning, where parameter updates of ML modules are exchanged between nodes, e.g., a UE and/or a base station.

In some aspects, ML modules may be implemented to help assist different communication functions. For instance, ML algorithms may be implemented to improve a channel prediction or channel decoder with nonlinear impairments. Moreover, certain types of ML modules may be implemented on different wireless devices, e.g., a UE, and may utilize over-the-air (OTA) signals as an input to ML modules. For example, a ML algorithm may be utilized to provide accurate positioning based on radio frequency (RF) sensing and/or positioning reference signals (RS).

Figure 4:
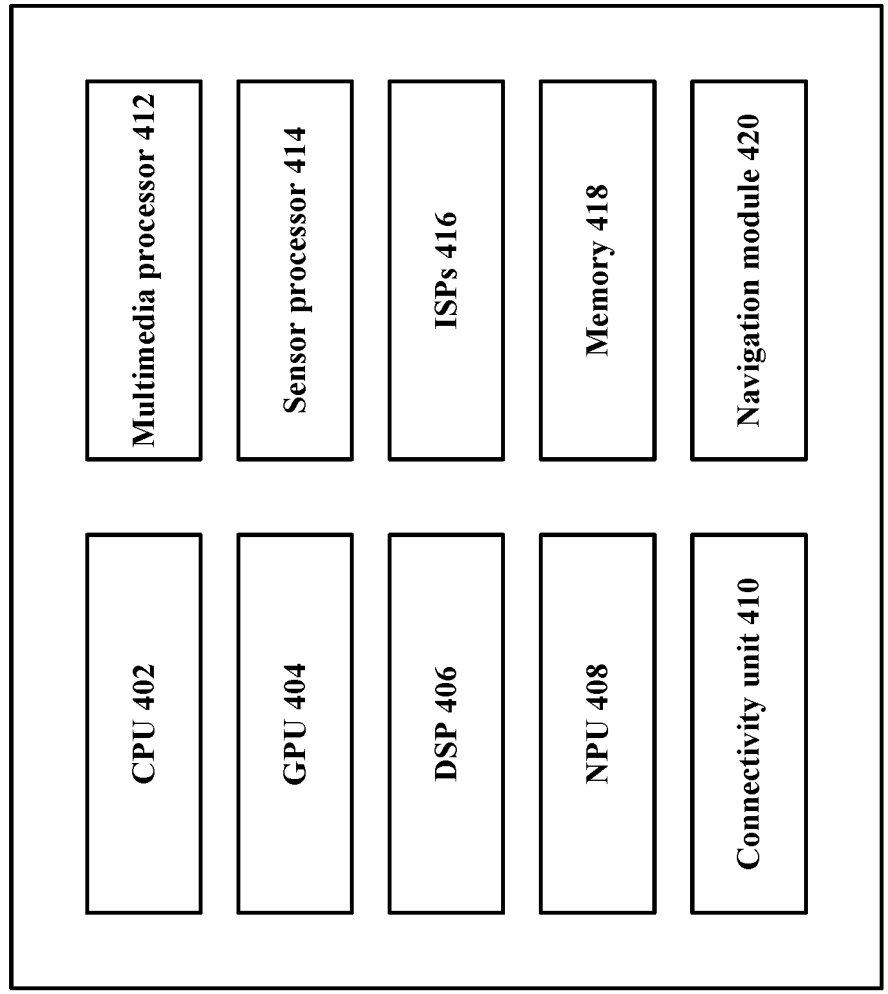
FIG. 4 is a diagram illustrating an example system-on-chip (SOC) for ML operations.

FIG. 4 is a diagram illustrating an example system-on-chip (SOC) 400 for ML operations. As shown in FIG. 4, SOC 400 includes central processing unit (CPU) 402, graphics processing unit (GPU) 404, digital signal processor (DSP) 406, neural processing unit (NPU) 408, and connectivity unit 410. SOC 400 also includes multimedia processor 412, sensor processor 414, image signal processors (ISPs) 416, memory 418, and navigation module 420. As shown in FIG. 4, SOC 400 may include a CPU 402 or a multi-core CPU with an application to control machine learning algorithms. SOC 400 may be included in a base station or a UE, e.g., the base station 180 or UE 104. Different machine learning variables or system parameters associated with a computational device may be stored in memory 418 or a memory block associated with one or more of CPU 402, GPU 404, DSP 406, or NPU 408. Also, instructions executed at CPU 402 may be loaded from a program memory associated with the CPU 402 or memory 418.

As shown in FIG. 4, SOC 400 may include additional processing blocks tailored to specific functions, such as GPU 404, DSP 406, and connectivity unit 410, which may include certain types of wireless connectivity, e.g., 5G connectivity, 4G LTE connectivity, Wi-Fi connectivity, USB connectivity, etc. SOC 400 also includes multimedia processor 412 that may perform different functions, e.g., functions for detection and recognition. In one aspect, the NPU 408 may be implemented in the CPU 402, GPU 404, and/or DSP 406. SOC 400 may also include sensor processor 414, ISPs 416, and/or navigation module 420, which may include a global positioning system.

In some types of wireless systems, different UEs or wireless devices may operate different types of ML modules for different tasks or purposes. The ML module may be configured by a network (e.g., a base station or central nodes) to operate or run at different UEs. Also, the ML procedure or refinement of the ML module may be organized by the network or base station. Further, different aspects of the ML procedure may be performed at the UE and/or at the network or base station. In a centralized ML procedure, the network or base station may collect data from different UEs and operate the training via servers or cloud servers. In a distributed ML procedure, based on a configuration by the network or base station, UEs may compute updates based on different parameters and report those updates to the network or base station.

Figure 5:
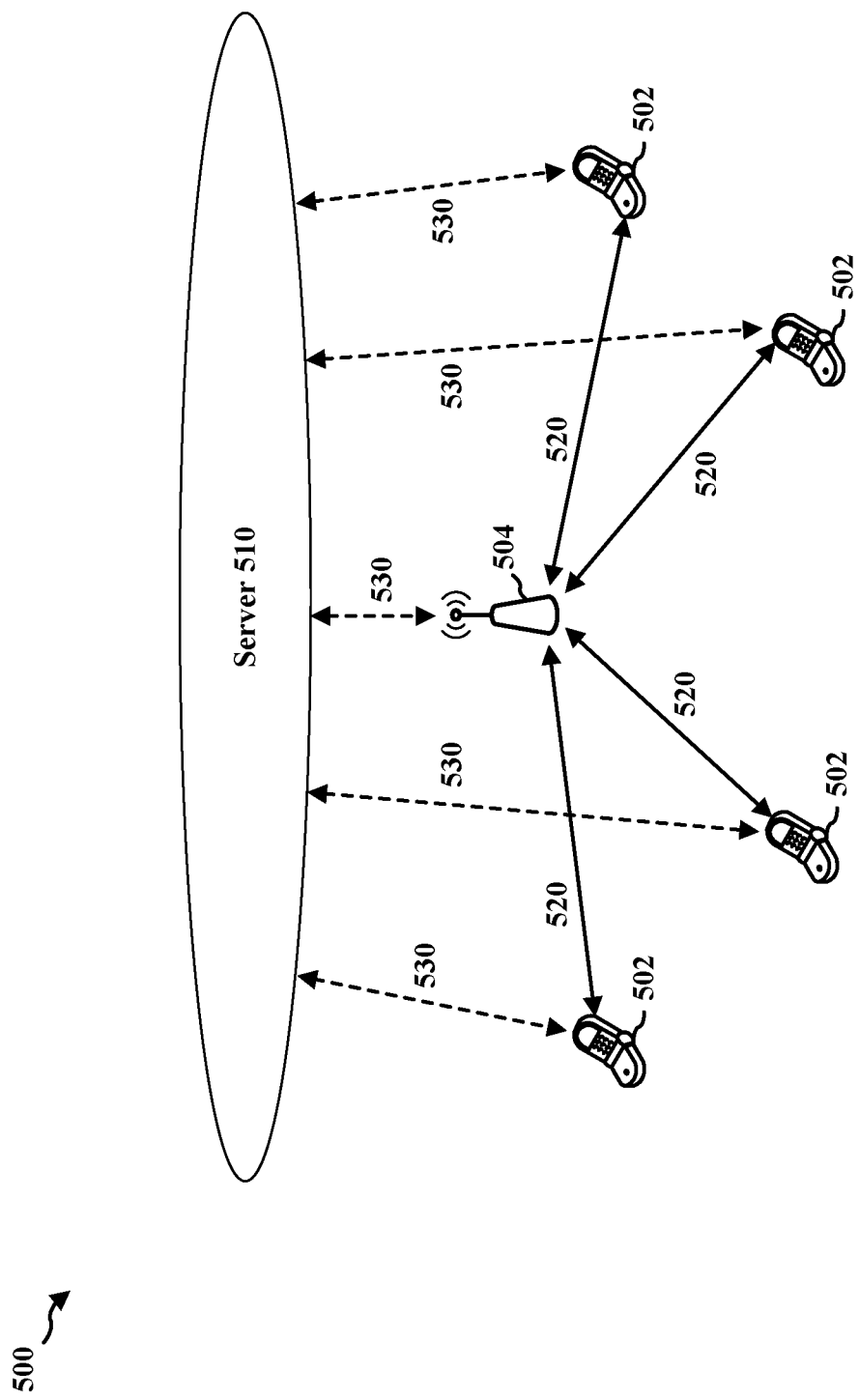
FIG. 5 is a diagram illustrating example communication between UEs and a base station.

FIG. 5 is a diagram 500 illustrating example communication between a number of UEs 502 and a base station 504. More specifically, diagram 500 displays a ML procedure between UEs 502 and base station 504. As shown in FIG. 5, base station 504 may collect data for the ML procedure from the UEs 502 via connections 520. The base station 504 may operate the ML procedure via server or cloud server 510. Further, each of the UEs 502 or base station 504 may communicate data for the ML procedure with server 510 via connections 530. The server or cloud server 510 may help to facilitate a number of different machine learning procedures between UEs 502 and base station 504. For instance, one or more UEs 502 may be performing a first ML procedure with the base station 504 via server 510, while one or more other UEs 502 may be performing a second ML procedure with the base station 504 via server 510. Diagram 500 illustrates an example of a centralized ML procedure, where the network or base station 504 may collect data from different UEs 502 and operate the ML procedure via server or cloud server 510.

In some types of ML procedures, different ML modules or ML applications may be supported based on a UE capability of the UE. For instance, a UE may support a neural network (NN) model with a number of layers, e.g., N layers, or a number of hidden units in the layers, e.g., M hidden units. Additionally, a UE may support computation using a processing unit at the UE, e.g., a graphics processing unit (GPU) or a central processing unit (CPU). Further, a UE may support a certain number of operations per second, e.g., X operations per second. Also, this UE capability at the UE for different ML modules or ML applications may change over time.

As indicated above, a capability of certain UEs to perform or operate different ML/AI functions may change over time. For instance, a UE's computation power may change over time based on a battery level of the UE. In these instances, a UE may prevent or forbid certain computation functions or GPU computations with a low battery level. Additionally, a UE capability to operate different ML functions may change over time based on a temperature level of a UE, i.e., a UE's overheating status. For example, the UE may prevent or forbid certain computation functions or GPU computations at a certain threshold temperature level. Other applications that are processing at the UE may also affect the UE capability to perform different ML functions. For example, if a UE is operating a certain application, e.g., a high definition (HD) gaming application, a certain processor at the UE, e.g., a GPU or CPU, may not be available for certain ML functions. Further, a UE's memory level or capability to perform different ML functions may change over time. The memory level at a UE may affect a number of different operations, e.g., computation speed at the UE, the size of different NNs, or a data size stored at the UE.

Based on the above, it may be beneficial for a UE to detect updates to a UE capability for different ML functions. For instance, it may be beneficial for a UE to determine a change in operation status at the UE, e.g., a change in battery level, temperature level, etc. It may also be beneficial for a UE to detect whether a certain application at the UE may affect ML functions. Additionally, it may be beneficial to determine whether a memory level or capability at the UE may affect ML functions. It may also be beneficial to report these changes in UE capability to a network or base station.

Aspects of the present disclosure may allow a UE to detect updates to a UE capability for different ML functions. Aspects of the present disclosure may also enable a UE to determine a change in operation status at the UE, e.g., a change in battery level, temperature level, etc. Further, aspects of the present disclosure may allow a UE to detect whether a certain application at a UE may affect ML functions. Moreover, aspects of the present disclosure may enable a UE to determine whether a memory level or capability at the UE may affect ML functions. By doing so, a UE may determine or detect whether it is capable of certain ML functions. Also, aspects of the present disclosure may allow a UE to report these changes in UE capability to a network or base station.

As indicated herein, in aspects of the present disclosure, a UE may report or signal a change in its ML capability to a network or base station. The report may be signaled or transmitted via a medium access control (MAC) control element (MAC-CE) or radio resource control (RRC) signaling. The report may be an indication, or vice versa, and/or the report may be referred to as an indication, or vice versa. This reporting or signaling may be configured as a periodic report, i.e., reported over a certain amount of time, or be an event-triggered report. In an event-triggered report, the triggering condition may be predefined, e.g., defined in a specification, or preconfigured, e.g., configured by network or base station. For example, the report may be triggered when an availability status of a processor changes, e.g., a GPU/CPU availability changes, or when a UE computation power changes by a certain amount, e.g., changes by a power of X.

In some aspects of the present disclosure, the reporting or signaling of a UE capability for ML procedures may be a two-part process, i.e., two-step messaging. The UE capability for ML procedures may also be referred to as a ML capability, or vice versa. For instance, the UE may transmit a scheduling request (SR) to the network or base station, e.g., via a physical uplink control channel (PUCCH). In response to the SR, the network or base station may send an uplink (UL) grant to the UE, e.g., via a physical downlink control channel (PDCCH), in order to schedule an UL transmission for the report. In some instances, the UL transmission may be a physical uplink shared channel (PUSCH) or a PUCCH that can carry the report via a MAC-CE or RRC signaling. After the UE receives the UL grant from the network or base station, the UE may send the report or indication of the ML capability based on the UL grant.

In some instances, there may be a dedicated report or indication for the UE to report its UE capability to the network or base station. For instance, there may be a dedicated report for the UE capability for inference, e.g., corresponding to forward propagation, and/or training, e.g., corresponding to backward propagation. For example, if the UE does not support forward propagation, the UE may report a UE capability for inference. Also, if the UE does not support backward propagation, the UE may report a UE capability for training. In some examples, a UE may report whether it supports training, as backward propagation may be costly or time consuming. Further, a UE may report whether it supports interference, as forward propagation may be costly or time consuming. Additionally, if the UE is configured with certain parameters for a ML algorithm, the UE may measure an UL channel for the ML capability reporting.

In some aspects of the present disclosure, the UE capability for ML procedures may be associated with one or more UE categories. Also, these one or more UE categories may correspond to a number of different parameters for the UE capability. In some aspects, the parameters for the UE capability may include whether hardware acceleration is supported, e.g., at a GPU or CPU. The parameters may also include a maximum model size, e.g., a number of layers of a neural network (NN) or a number of hidden units per layer. Further, the parameters may include a buffer size or memory size for ML procedures. The parameters may also include an operation frequency at the UE, e.g., a number of operations per second at the UE. Moreover, the parameters may include a number of supported models or libraries, as well as a number of locally cached models at the UE. Additionally, the parameters may include a scope of ML coverage, e.g., channel state information (CSI) reporting, positioning, sensor fusion, etc.

In some aspects, the one or more UE categories may be defined for the ML capability at the UE. For instance, the one or more UE categories for the ML capability may be defined to reduce the reporting overhead at the UE. Also, the one or more UE categories for the ML capability may be defined to mitigate any possible concern about revealing details at the UE. As indicated above, each UE category may correspond to a certain number of ranges and/or a certain number of parameters for the UE capability. These parameters and/or ranges for the UE capability may include at least one of: a hardware acceleration method (e.g., at a GPU or CPU), a maximum model size (e.g., a number of layers of a neural network (NN) or a number of hidden units per layer), a buffer size or memory size for a ML procedure, an operation frequency at the UE (e.g., a number of operations per second at the UE), one or more supported models or libraries, one or more locally cached models, or a scope of ML coverage.

In some aspects of the present disclosure, the UE categories for the ML capability at the UE may be statically reported or semi-statically reported to the network or base station. For instance, the UE categories for ML capability may be statically or semi-statically reported at the beginning of a connection via RRC signaling or messaging. Further, the UE categories for ML capability may be dynamically changed via a medium access control (MAC) control element (MAC-CE). UE categories for ML capability may also be defined together with new UE categories along with existing UE categories. In addition to parameters associated with UE categories, other types of ML parameters may be signaled to the network or base station. For example, other types of ML parameters may be signaled separately to the network or base station via RRC signaling or a MAC-CE. These other types of ML parameters may correspond to different UE characteristics, e.g., whether the UE may participate in certain online training algorithms. For example, ML parameters may correspond to a UE capability to support a certain type of server or cloud server for the ML procedure.

In some instances, the network or base station may send a query to a UE for ML capabilities. For instance, the network or base station may transmit a request for a UE's ML capabilities. This may be a request for certain types of UE capability parameters over time. In some aspects, a request from the network or base station may narrow a selection of ML models due to a preference or processing power at the network. This request from the network or base station may correspond to a number of different processes, e.g., a federated learning process, a demand for offline training, etc.

Figure 6:
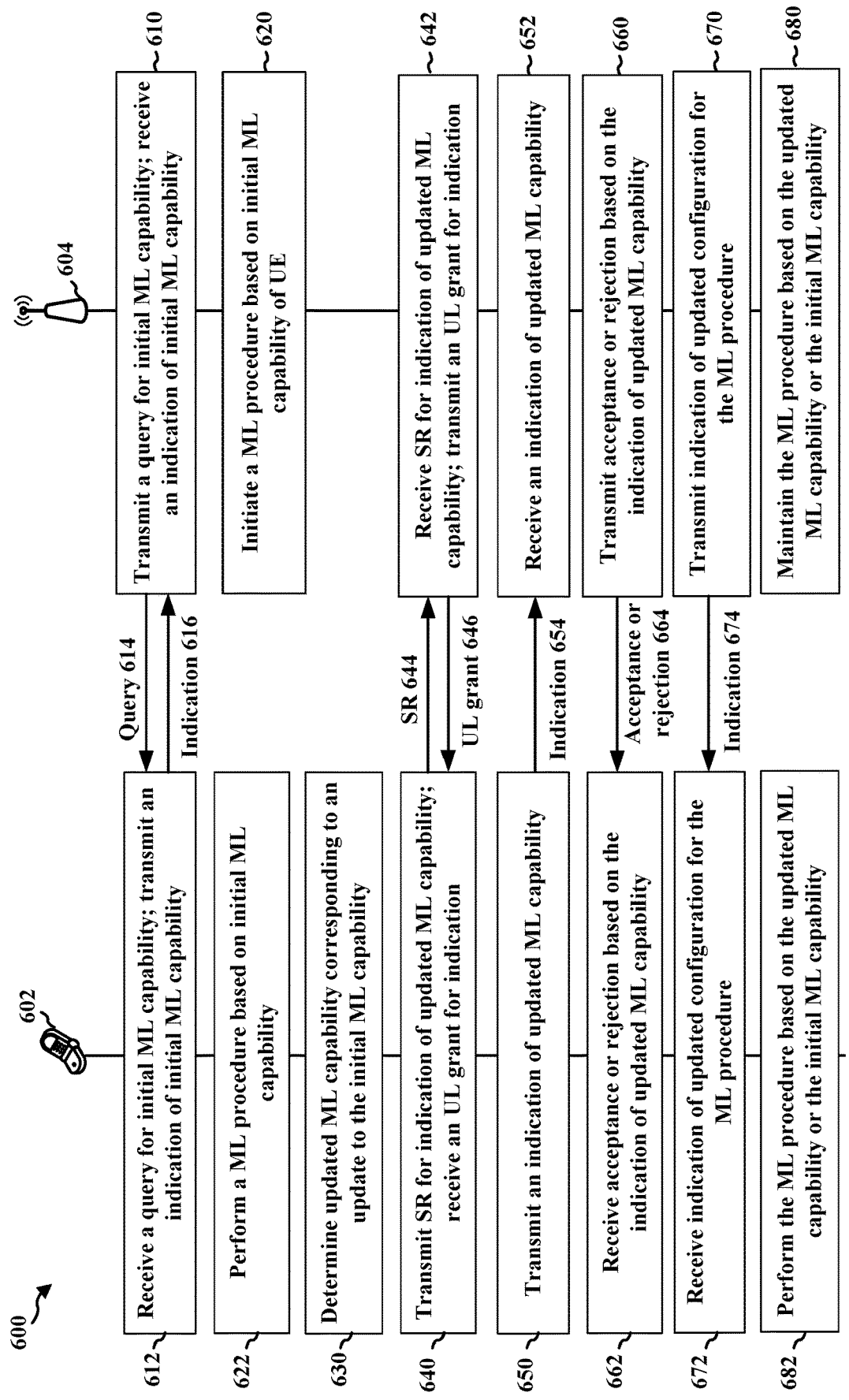
FIG. 6 is a diagram illustrating example communication between wireless devices.

FIG. 6 is a diagram 600 illustrating communication between UE 602 and base station 604. The UE 602 may correspond to UE 104, 350, 502, and apparatus 902. The base station 604 may correspond to base station 180, 310, 504, and apparatus 1002.

At 610, base station 604 may transmit, to UE 602, a query 614 for at least one initial ML capability; and receive, from the UE 602 based on the query, an indication 616 of the at least one initial ML capability. At 612, UE 602 may receive, from base station 604, a query 614 for at least one initial ML capability; and transmit, to the base station 604 based on the query, an indication 616 of the at least one initial ML capability.

At 620, base station 604 may initiate a ML procedure based on at least one initial ML capability of a UE. At 622, UE 602 may perform a ML procedure based on at least one initial ML capability of the UE. The ML procedure may be the same procedure that is initiated/performed at the base station 604 and the UE 602. In some instances, the UE 602 and the base station 604 may be performing different procedures or parts of an overall ML procedure. Additionally, the ML procedure may implement algorithms to improve channel prediction or channel decoding. The ML procedure may also implement certain modules on different wireless devices, e.g., the UE 602 or the base station 604, and may utilize OTA signals for the modules. Further, the ML procedure may utilize algorithms to provide accurate positioning based on RF sensing and/or positioning RS.

At 630, UE 602 may determine at least one updated ML capability for the ML procedure corresponding to an update to the at least one initial ML capability. In some instances, the at least one updated ML capability may be determined based on a triggering condition. The triggering condition may be at least one of: a battery level of the UE, a processing level of the UE, a temperature level of the UE, an application availability of the UE, or a processing unit availability of the UE. In some aspects, the at least one initial ML capability and the at least one updated ML capability may be associated with one or more UE categories. The one or more UE categories may correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage.

At 640, UE 602 may transmit, to the base station 604, a scheduling request (SR) 644 for an indication of at least one updated ML capability; and receive, from the base station 604 based on the scheduling request, an uplink (UL) grant 646 to schedule an UL transmission for the indication, where the indication is transmitted based on the UL grant. At 642, base station 604 may receive, from the UE 602, a scheduling request (SR) 644 for an indication of at least one updated ML capability; and transmit, to the UE 602 based on the scheduling request, an uplink (UL) grant 646 to schedule an UL transmission for the indication, where the indication is based on the UL grant. The UL transmission may be a physical uplink shared channel (PUSCH) or a physical uplink control channel (PUCCH).

At 650, UE 602 may transmit, to base station 604, an indication 654 of the at least one updated ML capability for the ML procedure. At 652, base station 604 may receive, from the UE 602, an indication 654 of at least one updated ML capability for the ML procedure. In some aspects, the indication may be transmitted/received via radio resource control (RRC) signaling or a medium access control (MAC) control element (MAC-CE). Also, the indication may be statically configured or semi-statically configured.

At 660, base station 604 may transmit, to the UE 602, an acceptance or a rejection 664 based on the indication of the at least one updated ML capability. At 662, UE 602 may receive, from the base station 604, an acceptance or a rejection 664 based on the indication of the at least one updated ML capability. In some aspects, if the acceptance is transmitted/received, the ML procedure may be performed based on the at least one updated ML capability. Also, if the rejection is transmitted/received, the ML procedure may be performed based on the at least one initial ML capability. Further, the acceptance or the rejection may be associated with an acknowledgement (ACK).

At 670, base station 604 may transmit, to the UE 602, an indication 674 of an updated configuration for the ML procedure based on the indication of the at least one updated ML capability. At 672, UE 602 may receive, from the base station 604, an indication 674 of an updated configuration for the ML procedure based on the indication of the at least one updated ML capability.

At 680, base station 604 may maintain the ML procedure based on the at least one updated ML capability or based on the at least one initial ML capability. At 682, UE 602 may perform the ML procedure based on the at least one updated ML capability or based on the at least one initial ML capability.

Figure 7:
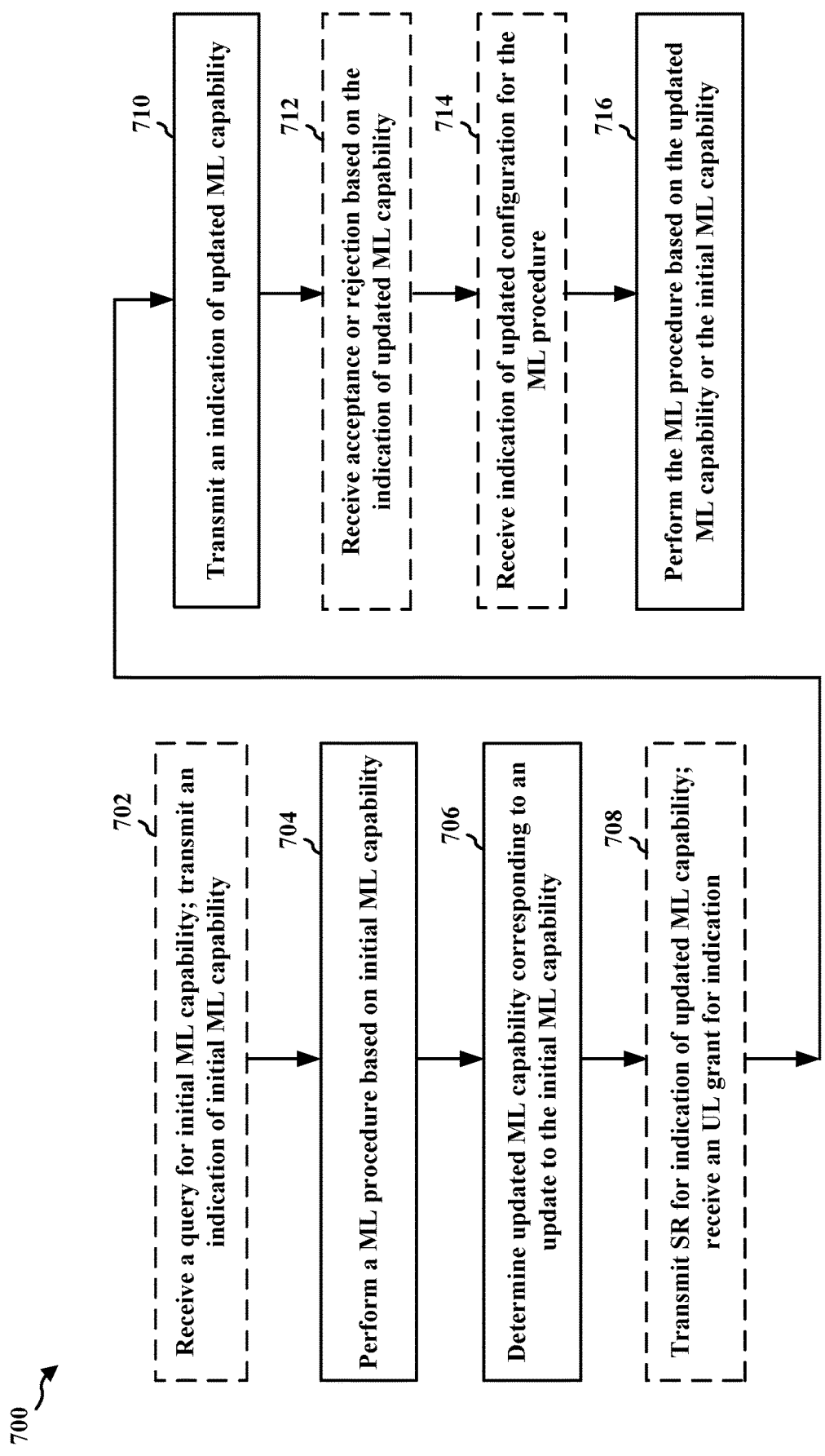
FIG. 7 is a flowchart of a method of wireless communication.

FIG. 7 is a flowchart 700 of a method of wireless communication. The method may be performed by an apparatus, such as a UE or a component of a UE (e.g., the UE 104, 350, 502, 602, and apparatus 902). Optional aspects are illustrated with a dashed line. The methods described herein can provide a number of benefits, such as improving communication signaling, resource utilization, and/or power savings.

At 702, the apparatus may receive, from a base station, a query for at least one initial ML capability; and transmit, to the base station based on the query, an indication of the at least one initial ML capability, as described in connection with the examples in FIGS. 4-6. For example, as described in 612 of FIG. 6, UE 602 may receive, from a base station, a query for at least one initial ML capability; and transmit, to the base station based on the query, an indication of the at least one initial ML capability. Further, 702 may be performed by determination component 940 in FIG. 9.

At 704, the apparatus may perform a ML procedure based on at least one initial ML capability of the UE, as described in connection with the examples in FIGS. 4-6. For example, as described in 622 of FIG. 6, UE 602 may perform a ML procedure based on at least one initial ML capability of the UE. Further, 704 may be performed by determination component 940 in FIG. 9.

At 706, the apparatus may determine at least one updated ML capability for the ML procedure corresponding to an update to the at least one initial ML capability, as described in connection with the examples in FIGS. 4-6. For example, as described in 630 of FIG. 6, UE 602 may determine at least one updated ML capability for the ML procedure corresponding to an update to the at least one initial ML capability. Further, 706 may be performed by determination component 940 in FIG. 9.

In some instances, the at least one updated ML capability may be determined based on a triggering condition, as described in connection with the examples in FIGS. 4-6. The triggering condition may be at least one of: a battery level of the UE, a processing level of the UE, a temperature level of the UE, an application availability of the UE, or a processing unit availability of the UE, as described in connection with the examples in FIGS. 4-6. In some aspects, the at least one initial ML capability and the at least one updated ML capability may be associated with one or more UE categories, as described in connection with the examples in FIGS. 4-6. The one or more UE categories may correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage, as described in connection with the examples in FIGS. 4-6.

At 708, the apparatus may transmit, to the base station, a scheduling request for the indication; and receive, from the base station based on the scheduling request, an uplink (UL) grant to schedule an UL transmission for the indication, where the indication is transmitted based on the UL grant, as described in connection with the examples in FIGS. 4-6. For example, as described in 640 of FIG. 6, UE 602 may transmit, to the base station, a scheduling request for the indication; and receive, from the base station based on the scheduling request, an uplink (UL) grant to schedule an UL transmission for the indication, where the indication is transmitted based on the UL grant. Further, 708 may be performed by determination component 940 in FIG. 9. The UL transmission may be a physical uplink shared channel (PUSCH) or a physical uplink control channel (PUCCH), as described in connection with the examples in FIGS. 4-6.

At 710, the apparatus may transmit, to a base station, an indication of the at least one updated ML capability for the ML procedure, as described in connection with the examples in FIGS. 4-6. For example, as described in 650 of FIG. 6, UE 602 may transmit, to a base station, an indication of the at least one updated ML capability for the ML procedure. Further, 710 may be performed by determination component 940 in FIG. 9. In some aspects, the indication may be transmitted via radio resource control (RRC) signaling or a medium access control (MAC) control element (MAC-CE), as described in connection with the examples in FIGS. 4-6. Also, the indication may be statically configured or semi-statically configured, as described in connection with the examples in FIGS. 4-6.

At 712, the apparatus may receive, from the base station, an acceptance or a rejection based on the indication of the at least one updated ML capability, as described in connection with the examples in FIGS. 4-6. For example, as described in 662 of FIG. 6, UE 602 may receive, from the base station, an acceptance or a rejection based on the indication of the at least one updated ML capability. Further, 712 may be performed by determination component 940 in FIG. 9. In some aspects, if the acceptance is received, the ML procedure may be performed based on the at least one updated ML capability, as described in connection with the examples in FIGS. 4-6. Also, if the rejection is received, the ML procedure may be performed based on the at least one initial ML capability, as described in connection with the examples in FIGS. 4-6. Further, the acceptance or the rejection may be associated with an acknowledgement (ACK), as described in connection with the examples in FIGS. 4-6.

At 714, the apparatus may receive, from the base station, an indication of an updated configuration for the ML procedure based on the indication of the at least one updated ML capability, as described in connection with the examples in FIGS. 4-6. For example, as described in 672 of FIG. 6, UE 602 may receive, from the base station, an indication of an updated configuration for the ML procedure based on the indication of the at least one updated ML capability. Further, 714 may be performed by determination component 940 in FIG. 9.

At 716, the apparatus may perform the ML procedure based on the at least one updated ML capability or based on the at least one initial ML capability, as described in connection with the examples in FIGS. 4-6. For example, as described in 682 of FIG. 6, UE 602 may perform the ML procedure based on the at least one updated ML capability or based on the at least one initial ML capability. Further, 716 may be performed by determination component 940 in FIG. 9.

Figure 8:
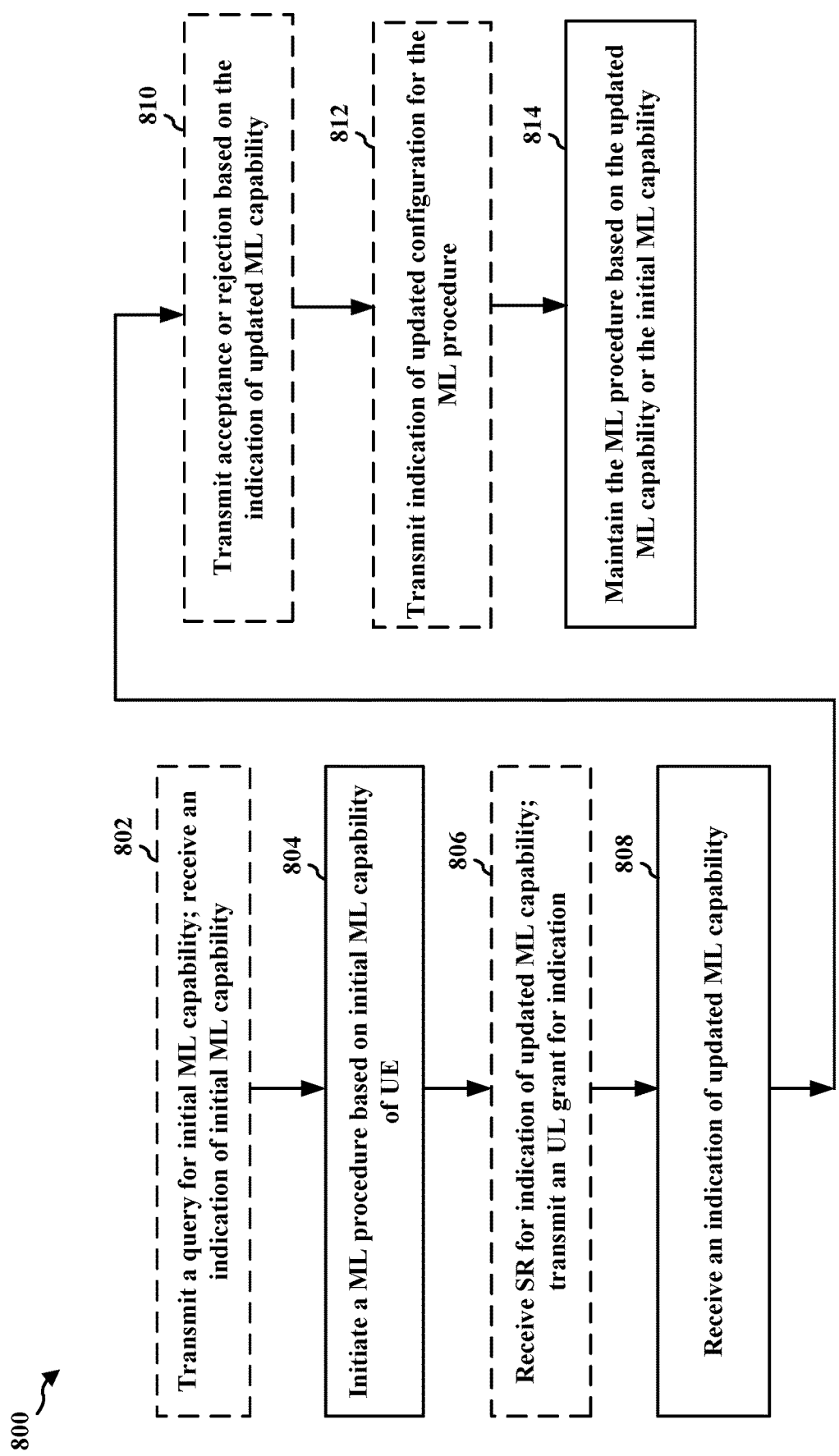
FIG. 8 is a flowchart of a method of wireless communication.

FIG. 8 is a flowchart 800 of a method of wireless communication. The method may be performed by an apparatus, such as a base station or a component of a base station (e.g., the base station 102, 180, 310, 504, 604; and apparatus 1002). Optional aspects are illustrated with a dashed line. The methods described herein can provide a number of benefits, such as improving communication signaling, resource utilization, and/or power savings.

At 802, the apparatus may transmit, to a UE, a query for at least one initial ML capability; and receive, from the UE based on the query, an indication of the at least one initial ML capability, as described in connection with the examples in FIGS. 4-6. For example, as described in 610 of FIG. 6, base station 604 may transmit, to a UE, a query for at least one initial ML capability; and receive, from the UE based on the query, an indication of the at least one initial ML capability. Further, 802 may be performed by determination component 1040 in FIG. 10.

At 804, the apparatus may initiate a machine learning (ML) procedure based on at least one initial ML capability of a UE, as described in connection with the examples in FIGS. 4-6. For example, as described in 620 of FIG. 6, base station 604 may initiate a machine learning (ML) procedure based on at least one initial ML capability of a UE. Further, 804 may be performed by determination component 1040 in FIG. 10.

At 806, the apparatus may receive, from the UE, a scheduling request for an indication; and transmit, to the UE based on the scheduling request, an uplink (UL) grant to schedule an UL transmission for the indication, where the indication is based on the UL grant, as described in connection with the examples in FIGS. 4-6. For example, as described in 642 of FIG. 6, base station 604 may receive, from the UE, a scheduling request for an indication; and transmit, to the UE based on the scheduling request, an uplink (UL) grant to schedule an UL transmission for the indication, where the indication is based on the UL grant. Further, 806 may be performed by determination component 1040 in FIG. 10. The UL transmission may be a physical uplink shared channel (PUSCH) or a physical uplink control channel (PUCCH), as described in connection with the examples in FIGS. 4-6.

At 808, the apparatus may receive, from the UE, an indication of at least one updated ML capability for the ML procedure, as described in connection with the examples in FIGS. 4-6. For example, as described in 652 of FIG. 6, base station 604 may receive, from the UE, an indication of at least one updated ML capability for the ML procedure. Further, 808 may be performed by determination component 1040 in FIG. 10. The indication may be received via radio resource control (RRC) signaling or a medium access control (MAC) control element (MAC-CE), as described in connection with the examples in FIGS. 4-6. Also, the indication may be statically configured or semi-statically configured, as described in connection with the examples in FIGS. 4-6.

In some aspects, the at least one initial ML capability and the at least one updated ML capability may be associated with one or more UE categories, as described in connection with the examples in FIGS. 4-6. The one or more UE categories may correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage, as described in connection with the examples in FIGS. 4-6. Also, the at least one updated ML capability may be based on a triggering condition, as described in connection with the examples in FIGS. 4-6. The triggering condition may be at least one of: a battery level of the UE, a processing level of the UE, a temperature level of the UE, an application availability of the UE, or a processing unit availability of the UE, as described in connection with the examples in FIGS. 4-6.

At 810, the apparatus may transmit, to the UE, an acceptance or a rejection based on the indication of the at least one updated ML capability, as described in connection with the examples in FIGS. 4-6. For example, as described in 660 of FIG. 6, base station 604 may transmit, to the UE, an acceptance or a rejection based on the indication of the at least one updated ML capability. Further, 810 may be performed by determination component 1040 in FIG. 10. If the acceptance is transmitted, the ML procedure may be maintained based on the at least one updated ML capability, as described in connection with the examples in FIGS. 4-6. Also, if the rejection is transmitted, the ML procedure may be maintained based on the at least one initial ML capability, as described in connection with the examples in FIGS. 4-6. The acceptance or the rejection may be associated with an acknowledgement (ACK), as described in connection with the examples in FIGS. 4-6.

At 812, the apparatus may transmit, to the UE, an indication of an updated configuration for the ML procedure based on the indication of the at least one updated ML capability, as described in connection with the examples in FIGS. 4-6. For example, as described in 670 of FIG. 6, base station 604 may transmit, to the UE, an indication of an updated configuration for the ML procedure based on the indication of the at least one updated ML capability. Further, 812 may be performed by determination component 1040 in FIG. 10.

At 814, the apparatus may maintain the ML procedure based on the at least one updated ML capability or based on the at least one initial ML capability, as described in connection with the examples in FIGS. 4-6. For example, as described in 680 of FIG. 6, base station 604 may maintain the ML procedure based on the at least one updated ML capability or based on the at least one initial ML capability. Further, 814 may be performed by determination component 1040 in FIG. 10.

Figure 9:
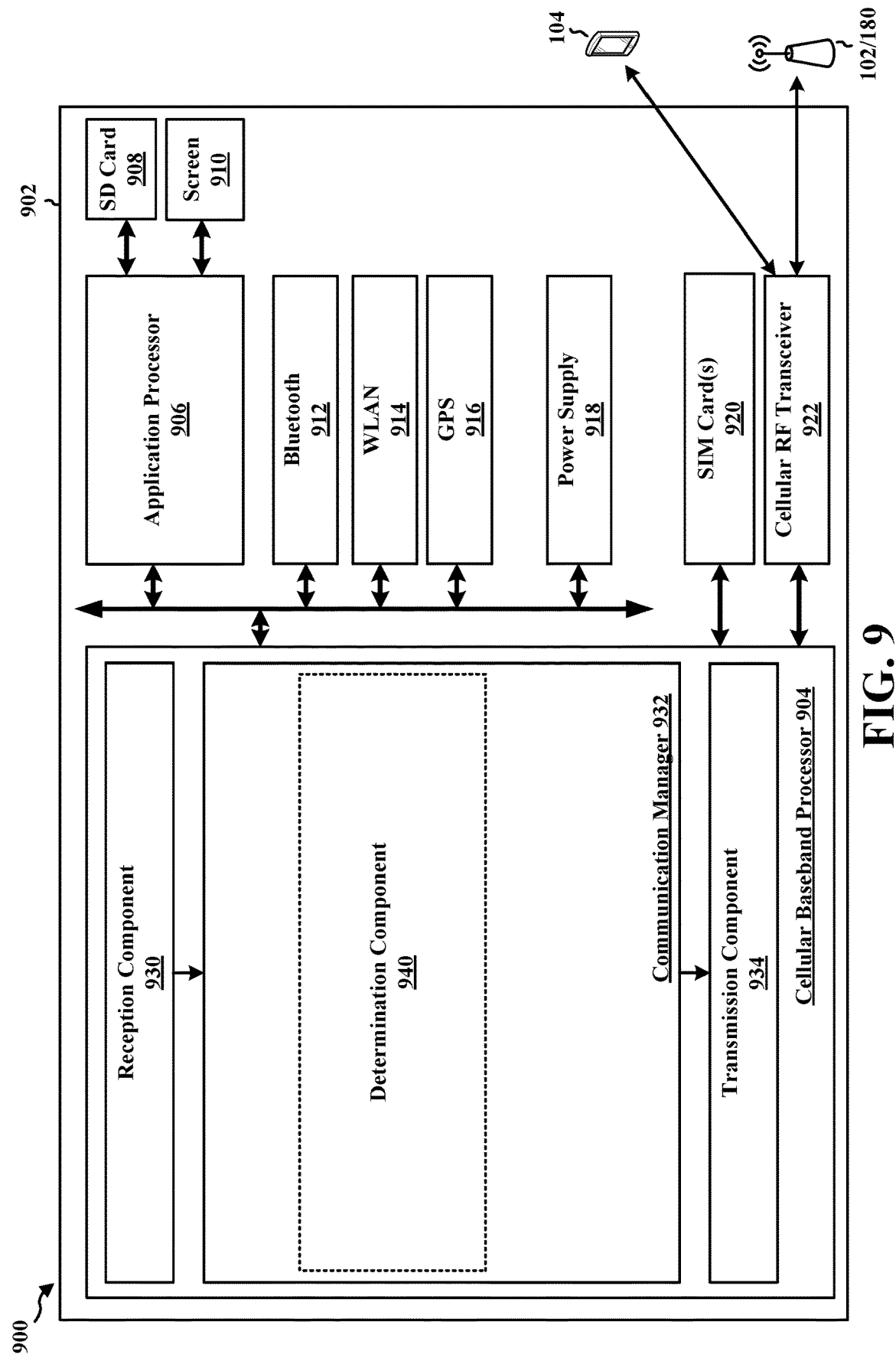
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a determination component 940 that is configured to receive, from the base station, a query for the at least one initial ML capability; and transmit, to the base station based on the query, an indication of the at least one initial ML capability, e.g., as described in connection with step 702 in FIG. 7. Determination component 940 may be further configured to perform a machine learning (ML) procedure based on at least one initial ML capability of the UE, e.g., as described in connection with step 704 in FIG. 7. Determination component 940 may be further configured to determine at least one updated ML capability for the ML procedure corresponding to an update to the at least one initial ML capability, e.g., as described in connection with step 706 in FIG. 7. Determination component 940 may be further configured to transmit, to the base station, a scheduling request for the indication; and receive, from the base station based on the scheduling request, an uplink (UL) grant to schedule an UL transmission for the indication, where the indication is transmitted based on the UL grant, e.g., as described in connection with step 708 in FIG. 7. Determination component 940 may be further configured to transmit, to a base station, an indication of the at least one updated ML capability for the ML procedure, e.g., as described in connection with step 710 in FIG. 7. Determination component 940 may be further configured to receive, from the base station, an acceptance or a rejection based on the indication of the at least one updated ML capability, e.g., as described in connection with step 712 in FIG. 7. Determination component 940 may be further configured to receive, from the base station, an indication of an updated configuration for the ML procedure based on the indication of the at least one updated ML capability, e.g., as described in connection with step 714 in FIG. 7. Determination component 940 may be further configured to perform the ML procedure based on the at least one updated ML capability or based on the at least one initial ML capability, e.g., as described in connection with step 716 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from the base station, a query for the at least one initial ML capability; means for transmitting, to the base station based on the query, an indication of the at least one initial ML capability; means for performing a machine learning (ML) procedure based on at least one initial ML capability of the UE; means for determining at least one updated ML capability for the ML procedure corresponding to an update to the at least one initial ML capability; means for transmitting, to the base station, a scheduling request for the indication; means for receiving, from the base station based on the scheduling request, an uplink (UL) grant to schedule an UL transmission for the indication, where the indication is transmitted based on the UL grant; means for transmitting, to a base station, an indication of the at least one updated ML capability for the ML procedure; means for receiving, from the base station, an acceptance or a rejection based on the indication of the at least one updated ML capability; means for receiving, from the base station, an indication of an updated configuration for the ML procedure based on the indication of the at least one updated ML capability; and means for performing the ML procedure based on the at least one updated ML capability or based on the at least one initial ML capability. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
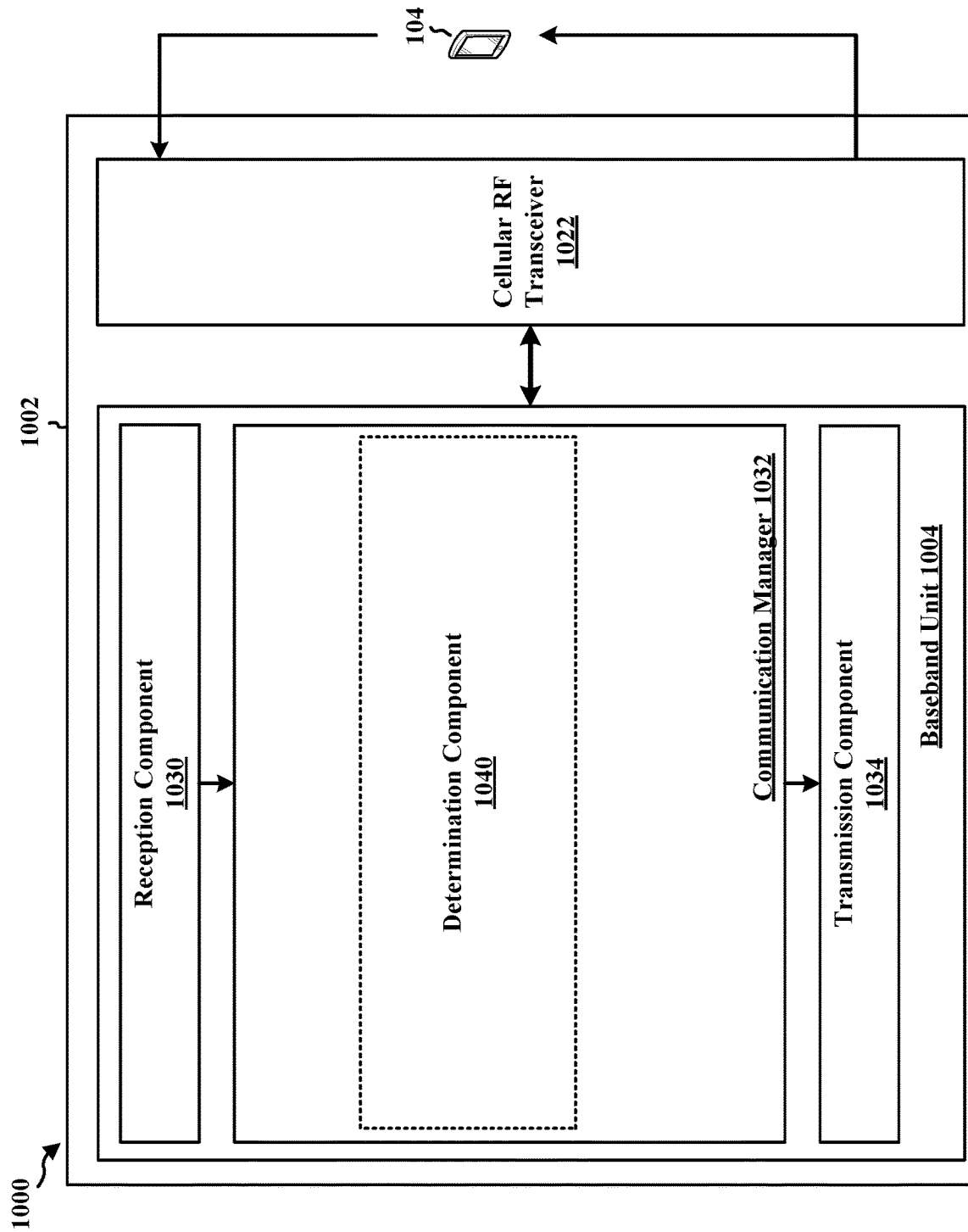
FIG. 10 is a diagram illustrating an example of a hardware implementation for an example apparatus.

FIG. 10 is a diagram 1000 illustrating an example of a hardware implementation for an apparatus 1002. The apparatus 1002 is a base station (BS) and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a determination component 1040 that is configured to transmit, to the UE, a query for the at least one initial ML capability; and receive, from the UE based on the query, an indication of the at least one initial ML capability, e.g., as described in connection with step 802 in FIG. 8. Determination component 1040 may be further configured to initiate a machine learning (ML) procedure based on at least one initial ML capability of a user equipment (UE), e.g., as described in connection with step 804 in FIG. 8. Determination component 1040 may be further configured to receive, from the UE, a scheduling request for the indication; and transmit, to the UE based on the scheduling request, an uplink (UL) grant to schedule an UL transmission for the indication, where the indication is based on the UL grant, e.g., as described in connection with step 806 in FIG. 8. Determination component 1040 may be further configured to receive, from the UE, an indication of at least one updated ML capability for the ML procedure, e.g., as described in connection with step 808 in FIG. 8. Determination component 1040 may be further configured to transmit, to the UE, an acceptance or a rejection based on the indication of the at least one updated ML capability, e.g., as described in connection with step 810 in FIG. 8. Determination component 1040 may be further configured to transmit, to the UE, an indication of an updated configuration for the ML procedure based on the indication of the at least one updated ML capability, e.g., as described in connection with step 812 in FIG. 8. Determination component 1040 may be further configured to maintain the ML procedure based on the at least one updated ML capability or based on the at least one initial ML capability, e.g., as described in connection with step 814 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to the UE, a query for the at least one initial ML capability; means for receiving, from the UE based on the query, an indication of the at least one initial ML capability; means for initiating a machine learning (ML) procedure based on at least one initial ML capability of a user equipment (UE); means for receiving, from the UE, a scheduling request for the indication; means for transmitting, to the UE based on the scheduling request, an uplink (UL) grant to schedule an UL transmission for the indication, where the indication is based on the UL grant; means for receiving, from the UE, an indication of at least one updated ML capability for the ML procedure; means for transmitting, to the UE, an acceptance or a rejection based on the indication of the at least one updated ML capability; means for transmitting, to the UE, an indication of an updated configuration for the ML procedure based on the indication of the at least one updated ML capability; and means for maintaining the ML procedure based on the at least one updated ML capability or based on the at least one initial ML capability. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE). The method includes performing a machine learning (ML) procedure based on at least one initial ML capability of the UE; determining at least one updated ML capability for the ML procedure corresponding to an update to the at least one initial ML capability; transmitting, to a base station, an indication of the at least one updated ML capability for the ML procedure; and performing the ML procedure based on the at least one updated ML capability or based on the at least one initial ML capability.

Aspect 2 is the method of aspect 1, where the at least one initial ML capability and the at least one updated ML capability are associated with one or more UE categories.

Aspect 3 is the method of any of aspects 1 and 2, where the one or more UE categories correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage.

Aspect 4 is the method of any of aspects 1 to 3, where the at least one updated ML capability is determined based on a triggering condition.

Aspect 5 is the method of any of aspects 1 to 4, where the triggering condition is at least one of: a battery level of the UE, a processing level of the UE, a temperature level of the UE, an application availability of the UE, or a processing unit availability of the UE.

Aspect 6 is the method of any of aspects 1 to 5, further including receiving, from the base station, an acceptance or a rejection based on the indication of the at least one updated ML capability.

Aspect 7 is the method of any of aspects 1 to 6, where, if the acceptance is received, the ML procedure is performed based on the at least one updated ML capability.

Aspect 8 is the method of any of aspects 1 to 7, where, if the rejection is received, the ML procedure is performed based on the at least one initial ML capability.

Aspect 9 is the method of any of aspects 1 to 8, where the acceptance or the rejection is associated with an acknowledgement (ACK).

Aspect 10 is the method of any of aspects 1 to 9, further including receiving, from the base station, an indication of an updated configuration for the ML procedure based on the indication of the at least one updated ML capability.

Aspect 11 is the method of any of aspects 1 to 10, further including transmitting, to the base station, a scheduling request for the indication; and receiving, from the base station based on the scheduling request, an uplink (UL) grant to schedule an UL transmission for the indication, where the indication is transmitted based on the UL grant.

Aspect 12 is the method of any of aspects 1 to 11, where the UL transmission is a physical uplink shared channel (PUSCH) or a physical uplink control channel (PUCCH).

Aspect 13 is the method of any of aspects 1 to 12, further including receiving, from the base station, a query for the at least one initial ML capability; and transmitting, to the base station based on the query, an indication of the at least one initial ML capability.

Aspect 14 is the method of any of aspects 1 to 13, where the indication is transmitted via radio resource control (RRC) signaling or a medium access control (MAC) control element (MAC-CE).

Aspect 15 is the method of any of aspects 1 to 14, where the indication is statically configured or semi-statically configured.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

Aspect 19 is a method of wireless communication at a base station. The method includes initiating a machine learning (ML) procedure based on at least one initial ML capability of a user equipment (UE); receiving, from the UE, an indication of at least one updated ML capability for the ML procedure; and maintaining the ML procedure based on the at least one updated ML capability or based on the at least one initial ML capability.

Aspect 20 is the method of aspect 19, where the at least one initial ML capability and the at least one updated ML capability are associated with one or more UE categories.

Aspect 21 is the method of any of aspects 19 to 20, where the one or more UE categories correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage.

Aspect 22 is the method of any of aspects 19 to 21, where the at least one updated ML capability is based on a triggering condition.

Aspect 23 is the method of any of aspects 19 to 22, where the triggering condition is at least one of: a battery level of the UE, a processing level of the UE, a temperature level of the UE, an application availability of the UE, or a processing unit availability of the UE.

Aspect 24 is the method of any of aspects 19 to 23, further including transmitting, to the UE, an acceptance or a rejection based on the indication of the at least one updated ML capability.

Aspect 25 is the method of any of aspects 19 to 24, where, if the acceptance is transmitted, the ML procedure is maintained based on the at least one updated ML capability.

Aspect 26 is the method of any of aspects 19 to 25, where, if the rejection is transmitted, the ML procedure is maintained based on the at least one initial ML capability.

Aspect 27 is the method of any of aspects 19 to 26, where the acceptance or the rejection is associated with an acknowledgement (ACK).

Aspect 28 is the method of any of aspects 19 to 27, further including transmitting, to the UE, an indication of an updated configuration for the ML procedure based on the indication of the at least one updated ML capability.

Aspect 29 is the method of any of aspects 19 to 28, further including receiving, from the UE, a scheduling request for the indication; and transmitting, to the UE based on the scheduling request, an uplink (UL) grant to schedule an UL transmission for the indication, where the indication is based on the UL grant.

Aspect 30 is the method of any of aspects 19 to 29, where the UL transmission is a physical uplink shared channel (PUSCH) or a physical uplink control channel (PUCCH).

Aspect 31 is the method of any of aspects 19 to 30, further including transmitting, to the UE, a query for the at least one initial ML capability; and receiving, from the UE based on the query, an indication of the at least one initial ML capability.

Aspect 32 is the method of any of aspects 19 to 31, where the indication is received via radio resource control (RRC) signaling or a medium access control (MAC) control element (MAC-CE).

Aspect 33 is the method of any of aspects 19 to 32, where the indication is statically configured or semi-statically configured.

Aspect 34 is an apparatus for wireless communication including at least one processor coupled to a memory and configured to implement a method as in any of aspects 19 to 33.

Aspect 35 is an apparatus for wireless communication including means for implementing a method as in any of aspects 19 to 33.

Aspect 36 is a computer-readable medium storing computer executable code, where the code when executed by a processor causes the processor to implement a method as in any of aspects 19 to 33.

What is claimed is:

1. An apparatus for wireless communication at a user equipment (UE), comprising:
    memory; and
    at least one processor coupled to the memory and configured to:
        perform a machine learning (ML) procedure based on at least one initial ML capability of the UE;
        determine at least one updated ML capability for the ML procedure corresponding to an update to the at least one initial ML capability, wherein the update is based on a change of the at least one initial ML capability over time;
        transmit, to a base station, an indication of the at least one updated ML capability for the ML procedure; and
        perform the ML procedure, that was performed based on the at least one initial ML capability of the UE and for which the at least one updated ML capability was determined, based on the at least one updated ML capability or based on the at least one initial ML capability.

2. The apparatus of claim 1, wherein the at least one initial ML capability and the at least one updated ML capability are associated with one or more UE categories.

3. The apparatus of claim 2, wherein the one or more UE categories correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage.

4. The apparatus of claim 1, wherein to determine the at least one updated ML capability for the ML procedure, the at least one processor is configured to determine the at least one updated ML capability based on a triggering condition.

5. The apparatus of claim 4, wherein the triggering condition is at least one of: a battery level of the UE, a processing level of the UE, a temperature level of the UE, an application availability of the UE, or a processing unit availability of the UE.

6. The apparatus of claim 1, wherein the at least one processor is further configured to:
receive, from the base station, an acceptance or a rejection based on the indication of the at least one updated ML capability.

7. The apparatus of claim 6, wherein, based on the reception of the acceptance, the at least one processor is configured to perform the ML procedure based on the at least one updated ML capability.

8. The apparatus of claim 6, wherein, based on the reception of the rejection, the at least one processor is configured to perform the ML procedure based on the at least one initial ML capability.

9. The apparatus of claim 6, wherein the acceptance or the rejection is associated with an acknowledgement (ACK).

10. The apparatus of claim 1, wherein the at least one processor is further configured to:
receive, from the base station, an indication of an updated configuration for the ML procedure based on the indication of the at least one updated ML capability.

11. The apparatus of claim 1, wherein the at least one processor is further configured to:
transmit, to the base station, a scheduling request for the indication; and
receive, from the base station based on the scheduling request, an uplink (UL) grant to schedule an UL transmission for the indication, wherein the indication is transmitted based on the UL grant.

12. The apparatus of claim 11, wherein the UL transmission is a physical uplink shared channel (PUSCH) or a physical uplink control channel (PUCCH).

13. The apparatus of claim 1, wherein the at least one processor is further configured to:
receive, from the base station, a query for the at least one initial ML capability; and
transmit, to the base station based on the query, an indication of the at least one initial ML capability.

14. The apparatus of claim 1, wherein the at least one processor is configured to transmit the indication via radio resource control (RRC) signaling or a medium access control (MAC) control element (MAC-CE).

15. The apparatus of claim 1, wherein the indication is associated with a static configuration or a semi-static configuration.

16. A method of wireless communication at a user equipment (UE), comprising:
performing a machine learning (ML) procedure based on at least one initial ML capability of the UE;
determining at least one updated ML capability for the ML procedure corresponding to an update to the at least one initial ML capability, wherein the update is based on a change of the at least one initial ML capability over time;
transmitting, to a base station, an indication of the at least one updated ML capability for the ML procedure; and
performing the ML procedure, that was performed based on the at least one initial ML capability of the UE and for which the at least one updated ML capability was determined, based on the at least one updated ML capability or based on the at least one initial ML capability.

17. An apparatus for wireless communication at a base station, comprising:
memory; and
at least one processor coupled to the memory and configured to:
initiate a machine learning (ML) procedure based on at least one initial ML capability of a user equipment (UE);
receive, from the UE, an indication of at least one updated ML capability for the ML procedure, wherein the at least one updated ML capability is based on a change of the at least one initial ML capability over time; and
maintain the ML procedure, that was initiated based on the at least one initial ML capability of the UE and for which the indication of the at least one updated ML capability was received, based on the at least one updated ML capability or based on the at least one initial ML capability.

18. The apparatus of claim 17, wherein the at least one initial ML capability and the at least one updated ML capability are associated with one or more UE categories.

19. The apparatus of claim 18, wherein the one or more UE categories correspond to one or more parameters including at least one of: a hardware acceleration method, a maximum model size, a buffer size or memory size for artificial intelligence (AI) or ML, an operation frequency, one or more supported models or libraries, one or more locally cached models, or a scope of AI or ML coverage.

20. The apparatus of claim 17, wherein the at least one updated ML capability is based on a triggering condition.

21. The apparatus of claim 20, wherein the triggering condition is at least one of: a battery level of the UE, a processing level of the UE, a temperature level of the UE, an application availability of the UE, or a processing unit availability of the UE.

22. The apparatus of claim 17, wherein the at least one processor is further configured to:
transmit, to the UE, an acceptance or a rejection based on the indication of the at least one updated ML capability.

23. The apparatus of claim 22, wherein, based on the transmission of the acceptance, the at least one processor is configured to maintain the ML procedure based on the at least one updated ML capability.

24. The apparatus of claim 22, wherein, based on the transmission of the rejection, the at least one processor is configured to maintain the ML procedure based on the at least one initial ML capability.

25. The apparatus of claim 22, wherein the acceptance or the rejection is associated with an acknowledgement (ACK).

26. The apparatus of claim 17, wherein the at least one processor is further configured to:
transmit, to the UE, an indication of an updated configuration for the ML procedure based on the indication of the at least one updated ML capability.

27. The apparatus of claim 17, wherein the at least one processor is further configured to:
receive, from the UE, a scheduling request for the indication; and
transmit, to the UE based on the scheduling request, an uplink (UL) grant to schedule an UL transmission for the indication, wherein the indication is based on the UL grant.

28. The apparatus of claim 27, wherein the UL transmission is a physical uplink shared channel (PUSCH) or a physical uplink control channel (PUCCH).

29. The apparatus of claim 17, wherein the at least one processor is further configured to:
transmit, to the UE, a query for the at least one initial ML capability; and receive, from the UE based on the query, an indication of the at least one initial ML capability.

30. A method of wireless communication at a base station, comprising:

initiating a machine learning (ML) procedure based on at least one initial ML capability of a user equipment (UE);

receiving, from the UE, an indication of at least one updated ML capability for the ML procedure, wherein the at least one updated ML capability is based on a change of the at least one initial ML capability over time; and maintaining the ML procedure, that was initiated based on the at least one initial ML capability of the UE and for which the indication was received, based on the at least one updated ML capability or based on the at least one initial ML capability.

\* \* \* \* \*